United States Patent [19]
McNair

[11] Patent Number: 5,504,810
[45] Date of Patent: Apr. 2, 1996

[54] TELECOMMUNICATIONS FRAUD DETECTION SCHEME

[75] Inventor: Bruce E. McNair, Holmdel, N.J.

[73] Assignee: AT&T Corp., Murray Hill, N.J.

[21] Appl. No.: 125,467

[22] Filed: Sep. 22, 1993

[51] Int. Cl.⁶ .................................................. H04M 1/66
[52] U.S. Cl. ............................ 379/189; 379/6; 379/188
[58] Field of Search ................................. 379/6, 14, 28,
379/29, 189, 351, 4, 188, 21, 22, 5, 90,
393, 32, 197, 119, 116, 235, 246, 112

[56] References Cited

U.S. PATENT DOCUMENTS

| | | | |
|---|---|---|---|
| 4,001,513 | 1/1977 | Naylor | 379/189 |
| 4,002,848 | 1/1977 | Stein | 379/116 |
| 4,182,934 | 1/1980 | Keys et al. | 379/189 |
| 4,284,851 | 8/1981 | Schweitzer et al. | 379/189 |
| 4,467,148 | 8/1984 | Stafford et al. | 379/6 |
| 4,885,767 | 12/1989 | Therrien | 379/189 |
| 5,357,564 | 10/1994 | Gupta et al. | 379/112 |

Primary Examiner—Jeffery A. Hofsass
Assistant Examiner—Scott Wolinsky
Attorney, Agent, or Firm—Gerard A. deBlasi; Gregory C. Ranieri

[57] ABSTRACT

Methods and apparatus are disclosed for providing increased security in a telecommunications network by using quasi-time domain reflectometry techniques to identify those telephone calls which comprise multiple legs. Echo data are collected for the telephone call from a predetermined point in the network to a point where the call originated. The data are processed to generate an indication of whether the telephone call comprises multiple legs, thus identifying those calls most susceptible to unauthorized use. The indication that a telephone call comprises multiple legs is advantageously used together with call attribute information, such as whether the call is placed to an international destination, to determine whether a given multiple-leg call is most likely a valid access to the communication system or most likely fraudulent.

10 Claims, 4 Drawing Sheets

500

| NPA & EXCHANGE | COORDINATES (LAT., LONG.) | DISTANCE (MILES) |
|---|---|---|
| 908-949 | $X_1°, Y_1°$ | 110 |
| 908-957 | $X_2°, Y_2°$ | 105 |
| ○ | ○ | ○ |
| ○ | ○ | ○ |
| ○ | ○ | ○ |
| ○ | ○ | ○ |
| ○ | ○ | ○ |
| 415-762 | $X_n°, Y_n°$ | 2300 |

502    504    506

TELECOMMUNICATIONS FRAUD DETECTION SCHEME

FIELD OF THE INVENTION

This invention relates generally to detecting and controlling unauthorized use of telecommunications networks.

BACKGROUND OF THE INVENTION

There are currently many situations in which telecommunications networks are used by individuals without authorization. Unauthorized network use places a large financial burden on the entity which owns the network or pays for use of the network. The risk of loss due to unauthorized use is particularly acute in those networks which allow access to the network remotely, for example, through the use of an authorization code and a toll-free ("800") telephone number. The authorization code is used to gain access to a private branch exchange (PBX) which provides "remote access" capabilities—the ability to access private network facilities from off-network locations—to a network customer or PBX owner (collectively referred to as a "subscriber"). Remote access is useful, for example, for allowing a salesperson traveling outside company premises to place calls through the subscriber's PBX to take advantage of volume discount rates. Though useful and convenient, this remote access capability may present a security risk to the subscriber by inadvertently providing an opportunity for unauthorized users to gain access to the network.

Current methods for detecting and preventing unauthorized remote access to a communications network typically involve analyzing traffic patterns on the network. For example, one technique involves analyzing the average call duration or the number of calls placed to foreign countries to determine whether the traffic patterns are consistent with a subscriber's call history or call pattern profile. In the event that a call is inconsistent with the subscriber's call pattern profile, the subscriber is provided with a report of the abnormal call activity. Other methods for dealing with the problem of unauthorized use involve automatically denying or blocking access to the network when abnormal use is detected so as to minimize the subscriber's financial loss.

Systems which use these techniques may annoy valid users of the network whose authorized calls are blocked inadvertently. Also, systems which automatically deny access encourage "hackers" seeking access to the network to try other authorization codes or points of entry to the network. Such systems do not provide a means for identifying security weaknesses within the network to permit improvement or correction.

SUMMARY OF THE INVENTION

Increased network security is provided in accordance with the invention by using quasi-time domain reflectometry techniques to identify those telephone calls which are most likely fraudulent. As used herein, "quasi-time domain reflectometry techniques" refers to using echo reflections within the path of a telephone call to generate information about distances between equipment in the call path. Echo data are collected for the telephone call from a predetermined point in the network to a point where the call originated. The data are either processed to generate an indication of whether the telephone call comprises multiple legs or are compared with call attribute data to determine whether the telephone call is most likely valid or most likely fraudulent. In this manner, those telephone calls most susceptible to unauthorized use, such as remote access calls placed through a PBX, are readily identified.

In an exemplary embodiment of the invention, the indication that a telephone call comprises multiple legs is advantageously used together with call attribute information, such as whether the call is placed to an international destination, to determine whether a given multiple-leg call is most likely a valid access to the communication system or most likely fraudulent. Similarly, the determination that a given call is a multiple-leg (e.g., remote access) call, together with selected call pattern information characteristic of a particular subscriber (such as the subscriber's average call duration or that the subscriber typically does not place international calls using the remote access capability) provide an indication that the call does not fit the subscriber's call pattern profile. In such cases, appropriate steps are taken to minimize costs for unauthorized network use. For example, the subscriber is notified or the call is interrupted, and particular security weaknesses within the subscriber's network or PBX software are identified.

DETAILED DESCRIPTION

Before describing the implementation details and novel features of the present invention, it will be useful for illustration purposes to describe an exemplary communications network configured to provide remote access capability. Remote access capability, as described above, allows a subscriber to make telephone calls through the subscriber's facilities from locations remote to the subscriber's facilities so as to minimize telecommunications costs. Remote access capabilities, however, may render a subscriber's facilities susceptible to unauthorized use, because the same authorization code that gives the subscriber access to the facilities can be misused by unauthorized users to illegally gain access to those facilities.

Figure 1:
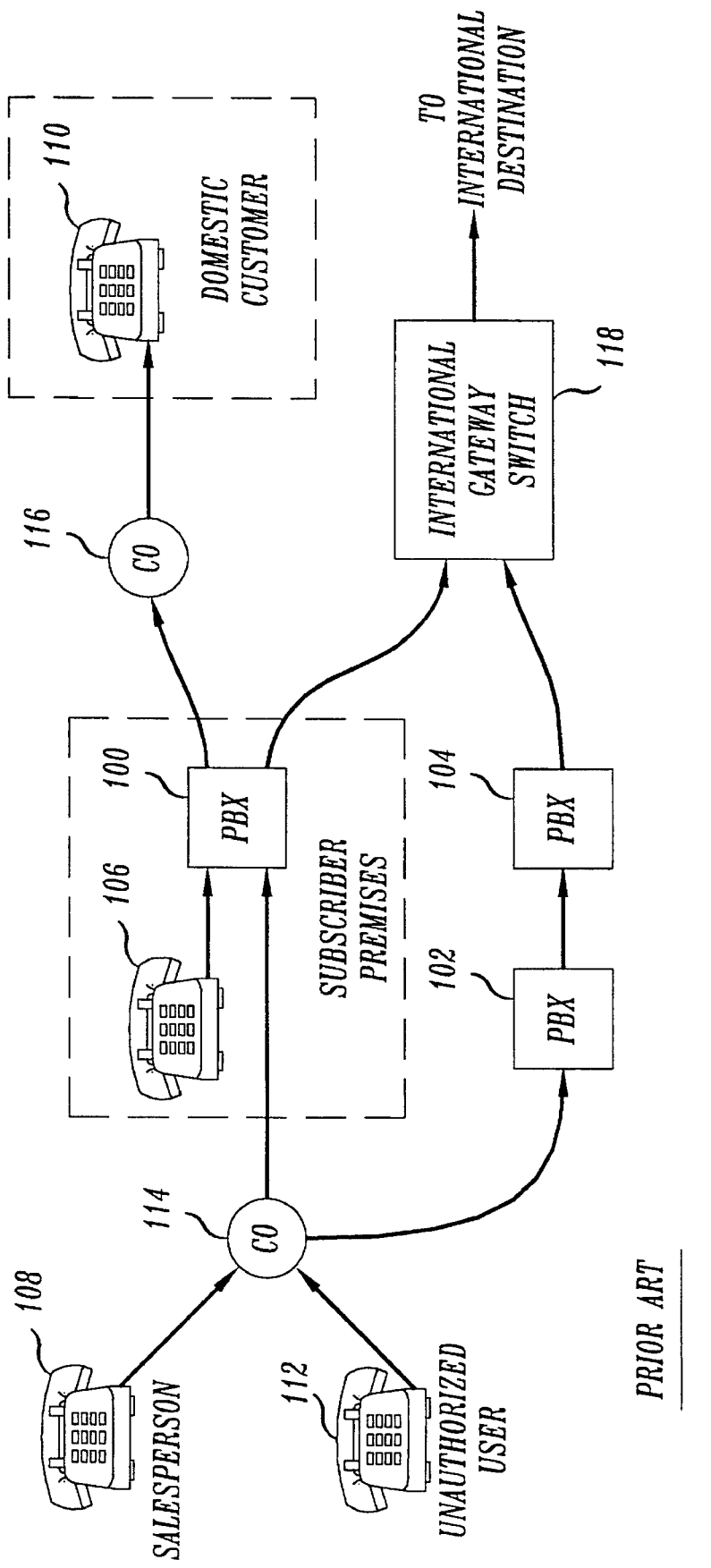
FIG. 1 is a simplified block diagram of a conventional communications network.

FIG. 1 shows a communications network which includes three private branch exchanges (PBXs) 100, 102, and 104, telephone stations 106, 108, 110, and 112, central offices 114 and 116, and an international gateway switch 118 which is configured to switch calls to an international destination (not shown). The network also includes additional central offices and interexchange carrier switches which have been omitted from the figure for clarity. PBXs 100, 102, and 104 are configured to provide remote access capability.

The subscriber (i.e., one of the subscriber's salespersons) can use the remote access capabilities of PBX 100 to place remote access telephone calls from telephone station 108 to the subscriber's domestic customer at telephone station 110, for example, by dialing an 800 number to access PBX 100. PBX 100 then initiates a second call, which originates at the PBX, to telephone station 110. PBX 100 next bridges the first and second calls (which are also referred to as the first and second "legs" of the bridged call) to permit the subscriber at telephone station 108 to talk to the domestic customer at telephone station 110. Because the second leg of the call originates at PBX 100, the subscriber can make toll-free calls from remote locations which are billed as if made from the subscriber's premises, typically at a volume discount rate.

PBX 100 typically will be configured to permit the subscriber to place outbound international calls. For example, calls from telephone station 106, which is connected directly to PBX 100, can be placed to international destinations through international gateway switch 118. It is this international dialing capability which often is the target of unauthorized users.

In particular, an unauthorized user placing calls from telephone station 112 can use the remote access capability of PBX 100 to place international calls through international gateway switch 118 while charging the cost of the call to the subscriber. This type of fraud can be difficult to detect, because the subscriber often cannot distinguish between (1) authorized international calls placed from telephone station 106, (2) authorized international calls placed from telephone station 108 using the remote access capability of PBX 100, and (3) unauthorized, fraudulent international calls placed from telephone station 112 using the remote access capability of PBX 100.

FIG. 1 shows a second example of how an unauthorized user at telephone station 112 can place calls to an international destination. In particular, the call is placed through more than one PBX, so as to further obscure the unauthorized user's identity. For example, a call placed from telephone station 112 can use the remote access capability of a first PBX 102 to dial up the remote access capability of a second PBX, namely, PBX 104. The remote access capability of PBX 104 is then used to place an international call through international gateway switch 118. Prior art fraud detection techniques are ill-equipped to handle this type of fraudulent call.

Multiple-leg calls (including calls placed through two or more PBXs) are distinguished from single leg calls, in accordance with the present invention, using quasi-time domain reflectometry techniques. Echo data are collected for the telephone call from a predetermined point in the network to a point where the call originated. As described below, the data are processed to generate an indication of whether the telephone call comprises multiple legs, thus identifying those calls most susceptible to unauthorized use. Information about the number of legs of a given call is processed together with other information about the call to determine whether the call most likely resulted from a valid access to the communication system or is most likely fraudulent.

More particularly, information about the echo path for a particular call, such as the echo return loss (i.e., the echo delay time) or the number of echo peaks occurring over the echo path, is used to determine whether the call has multiple legs (e.g., whether the call is a remote access call placed through a PBX). The existence of multiple legs within a call often will be sufficient, in itself, to indicate that a particular call is most likely fraudulent. A more reliable indication can be obtained, however, by analyzing the determination that a given call is a multiple-leg call together with selected attributes of the call. For example, a multiple-leg call placed to a country notorious for drug trafficking can be flagged as a call that is most likely fraudulent. Alternatively, the determination that a given call is a multiple-leg call can be analyzed together with a subscriber's call pattern information. For example, the subscriber's average call duration, or an indication that the subscriber typically does not place international calls using the remote access capability of the subscriber's PBX, can be compared with data obtained from the call to provide an indication that the call does not fit the subscriber's call pattern profile. When the existence of fraud is indicated, appropriate steps are taken to minimize costs for unauthorized network use. For example, the subscriber is notified or the call is interrupted. Moreover, particular security weaknesses within the subscriber's network or PBX software can be readily identified.

Figure 2:
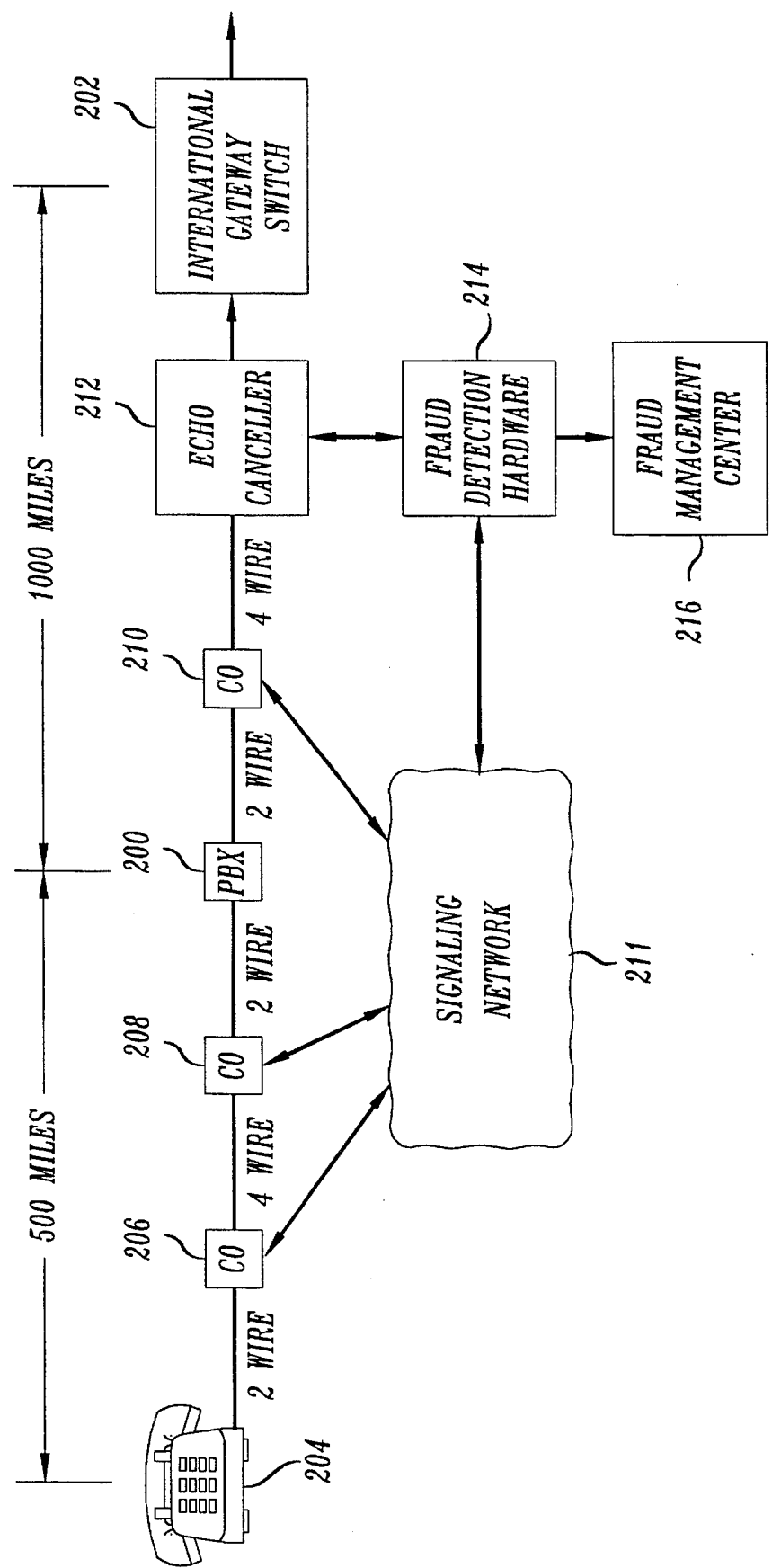
FIG. 2 is a simplified block diagram of a portion of a communications network constructed in accordance with the principles of the invention.

FIG. 2 shows an exemplary call path in a communication network constructed in accordance with the invention. The call path includes a PBX 200, an international gateway switch 202, a telephone station 204, central offices 206, 208, and 210, a signaling network 211, an echo canceller 212, fraud detection hardware 214, and a fraud management center 216. (The call path may include other switches, such as interexchange carrier switches, which are not shown.) Central offices 206, 208, and 210 illustratively are 5ESS® switches manufactured by American Telephone & Telegraph Co., Inc. (AT&T). International gateway switch 202 illustratively is a 4ESS™ switch manufactured by AT&T. Echo canceller 212 is a conventional echo canceller that is used to minimize echo for all calls switched through international gateway switch 202. As described below, fraud detection hardware 214 and fraud management center 216 perform the processing required to determine whether a particular call has multiple legs and whether that call is most likely valid or most likely fraudulent.

PBX 200 is configured to permit outbound international calling and to provide remote access capability. Calls placed from telephone station 204 to an international destination using the remote access capability of PBX 200 have two legs. The first leg comprises a call originating from telephone station 204 and terminating at PBX 200. The first leg is switched through central offices 206 and 208. The second leg comprises a call which originates from PBX 200 and is routed through international gateway switch 202 to terminate at the international destination. The second leg is routed through central office 210, echo canceller 212, and international gateway switch 202. When the two legs are established, PBX 200 bridges the two legs into a single, multiple-leg call which is said to "originate" at telephone station 204.

As shown in FIG. 2, several components of the communication network are interconnected using 2-wire connections, while other components are interconnected using 4-wire connections. In particular, the connections between telephone station 204 and central office 206, and between PBX 200 and central offices 208 and 210 are 2-wire connections. The connections between central offices 206 and 208 and between central office 210 and echo canceller 212 are 4-wire connections. The conversion between 2wire and 4-wire connections are performed by circuits commonly referred to as "hybrids." Because the hybrids cannot be balanced perfectly, some echo will be introduced at the hybrids. As described in greater detail below, the present invention advantageously uses the echo produced at the hybrids to determine the number of legs in a telephone call.

During the setup of a typical call switched through international gateway switch 202, echo canceller 212 will send a probe signal through the network to determine the echo characteristics of the network. Echo canceller 212 sends the probe signal in a conventional manner to explicitly determine the bulk delay, so that the echo canceller can build a model of the echo path for the call. Echo data generated by the probe signal also is provided to fraud detection hardware 214 for processing in accordance with the invention. The probe signal from echo canceller 212 is directed through the network to telephone station 204, generating significant echo peaks at those points in the network where the probe signal encounters imperfectly balanced hybrids. Each echo peak indicates a different leg of the call. These echo peaks return to echo canceller 212 and are advantageously used to determine the number of legs in the call.

Figure 3:
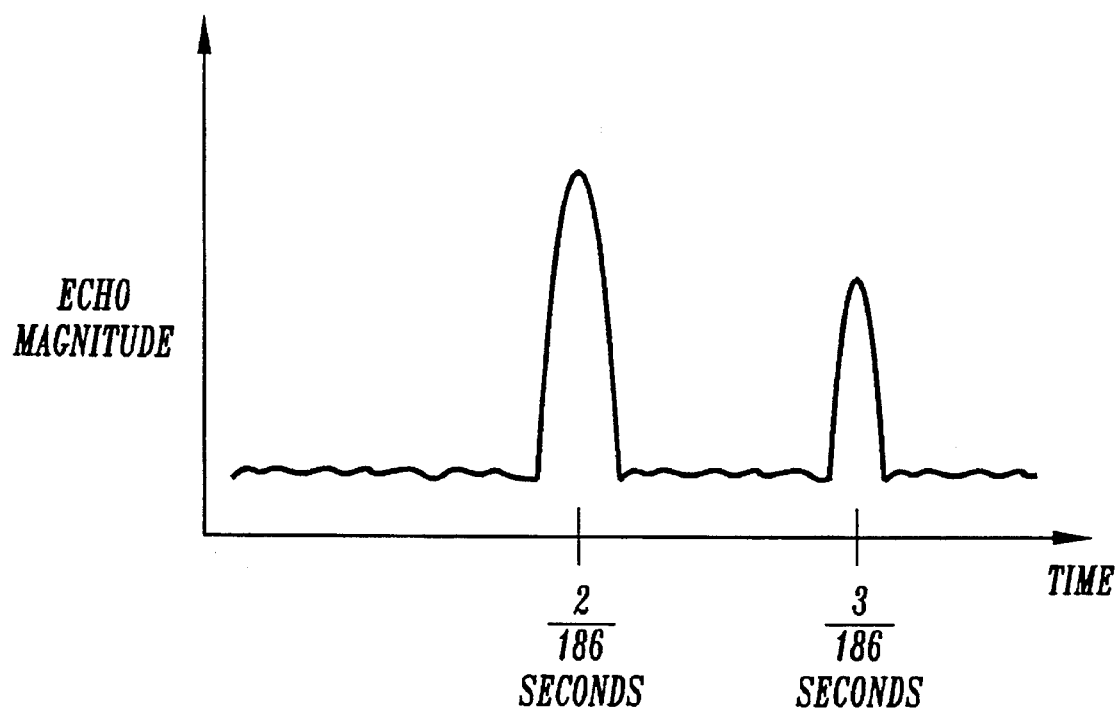
FIG. 3 is a graph of an illustrative echo plot of the network of FIG. 2.

In the network of FIG. 2, the probe signal output by echo canceller 212 will create two echo peaks which are separated by a time delay. FIG. 3 shows an exemplary plot of echo magnitude versus time for the path from echo canceller 212 to telephone station 204. Assume that the path length of the first leg of the call (extending between telephone station 204 and PBX 200) is 500 miles and that the path length of the second leg of the call (extending between PBX 200 and echo canceller 212) is 1,000 miles. Central office 206 and central offices 208 and 210 are assumed to be a negligible distance from telephone station 204 and PBX 200, respectively. Because an echo travels at approximately the speed of light, a delay of $2/186$ seconds will appear per 1,000 miles along the transmission path. (The delay is $2/186$ seconds rather than $1/186$ seconds because the echo must traverse a 2000 mile round trip.) Thus, FIG. 3 shows a first echo peak after $2/186$ seconds, the peak indicating the presence of the hybrids which perform the 2-wire to 4-wire conversions for PBX 200 (i.e., the second leg of the call). FIG. 3 also shows a second, smaller echo peak at $3/186$ seconds, indicating the presence of the hybrids in central office 206 (i.e., in the first leg of the call).

Occasionally, network conditions will cause two echo peaks to be generated which are separated in time by a small delay. For example, the two peaks may correspond to echoes occurring respectively at 1000 miles and 1025 miles from fraud detection hardware 214. In such a case, it may be desirable to compare the delay between the echo peaks with a predetermined minimum threshold level to prevent noise or acceptable network configurations (e.g., a PBX with an extension) from creating erroneous indications of fraudulent activity. If the delay between the peaks does not exceed the threshold level, the indication of multiple echo peaks is dismissed as resulting from noise or an acceptable network configuration not indicative of fraudulent activity.

Where a call is placed through several PBXs, for example, using the remote access capability of two or more PBXs as shown in FIG. 1, the probe signal output by echo canceller 212 will generate three or more echo peaks. A different peak will appear for each PBX, together with a peak for the hybrid associated with the originating telephone station. In this instance, fraud detection hardware 214 can be configured to automatically interrupt the call because it is unlikely that an authorized user of the communications network would place an international call through two PBX systems.

Referring again to FIG. 2, echo canceller 212 outputs the echo signals generated by the probe signal to fraud detection hardware 214 which processes the echoes in accordance with the invention. Fraud detection hardware 214 processes the echoes, for example, by first filtering the echoes to identify echo peaks which exceed a predetermined threshold magnitude, and then counting the echo peaks which exceed the threshold.

Figures 4, 5:
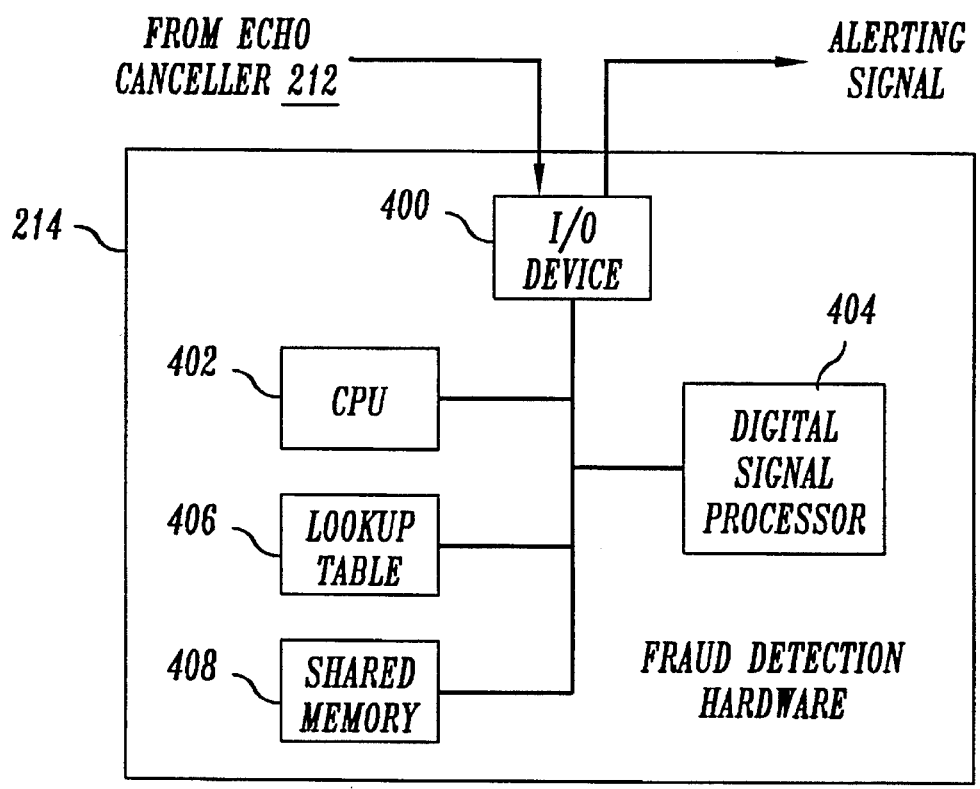
FIG. 4 is a simplified block diagram of an exemplary embodiment of the fraud detection hardware of FIG. 2.
FIG. 5 shows an exemplary embodiment of the lookup table of FIG. 4.

FIG. 4 shows an exemplary embodiment of fraud detection hardware 214. Fraud detection hardware 214 includes an input/output (I/O) device 400, a central processing unit (CPU) 402, a digital signal processor 404, a lookup table 406 for converting a caller's automatic number identifier (ANI) to a distance value, and a shared memory device 408. Digital signal processor 404 illustratively is a model DSP 16 manufactured by AT&T. Lookup table 406 illustratively is an ANI-to-vertical/horizontal map (see FIG. 5).

Fraud detection hardware 214 operates as follows. CPU 402 instructs digital signal processor 404 to probe the telephone channel for echo data. Echo samples from the channel are routed by CPU 402 from I/O device 400 to shared memory 408. CPU 402 next instructs digital signal processor 404 to compute the echo delays (alternatively CPU 402 receives an indication from digital signal processor 404 of the number of echo peaks detected). CPU 402 then compares the echo delay computed by digital signal processor 404 with delay data (retrieved from lookup table 406) for calls placed from the caller's ANI. The computed (actual) echo delay will be the delay associated with the call path to telephone station 204. If the call is multiple-leg call placed through a PBX, the ANI used to retrieve echo delay data from lookup table 406 will be that of the PBX rather than that of telephone station 204. If the computed delay and the delay from lookup table 406 differ by more than a predetermined amount that corresponds to an acceptable margin of error, indicating that the call originated from somewhere other than the ANI used in lookup table 406, CPU 402 outputs an alerting signal to fraud management center 216.

The alerting signal generated by fraud detection hardware 214 illustratively specifies the trunk number of the trunk carrying the call and several call parameters. The call parameters may include the originating ANI (e.g., the ANI of PBX 200), the destination telephone number, the number of echo peaks, and the distance from fraud detection hardware 214 of the equipment which generated the echo peaks.

FIG. 5 shows an exemplary ANI-to-vertical/horizontal map 500 suitable as lookup table 406. The map includes three columns 502, 504, and 506. Column 502 stores a list of Numbering Plan Areas (NPA) and exchanges found throughout the telephone system. Column 504 stores a list of corresponding latitude and longitude coordinates. Column 506 stores a list of the respective distances (in miles) between fraud detection hardware 214 and each of the latitude/longitude coordinate pairs. The distance from a point in the network to a latitude and longitude coordinate can be calculated as described in *ARRL Antenna Book*, 14th Ed., American Radio Relay League, Newington, Conn. 1984, Ch. 16, which is hereby incorporated by reference.

Fraud detection hardware 214 and fraud management center 216 are configured to take predetermined steps once it is determined that a given call comprises multiple legs. For example, fraud detection hardware 214 can be configured to generate an alerting signal for all international calls made using remote access. Fraud management center 216 can alert the subscriber of possible unauthorized access upon receipt of each alerting signal, or can be configured to perform further analysis for all multiple-leg calls using information obtained through signaling network 211 or derived from the call billing record. For example, upon detecting a multiple-leg call, fraud management center 216 can be configured to examine the average call duration or the country code of the international destination. (The information to perform analyses involving subscriber average call duration may be obtained by the subscriber and maintained in a database by fraud management center 216). If the call duration exceeds the subscriber's average call duration, or the call is placed to a country which is particularly suspect for telephone fraud, fraud management center 216 flags the call for further action, such as the attention of an attendant.

Once fraud management center 216 determines that a call is suspect and generates an indication to that effect, various steps which are well known in the prior art can be taken to minimize present and future losses for the subscriber. For example, fraud management center 216 may be configured to automatically notify the subscriber (either in real-time or at some convenient, predetermined interval) or automatically terminate the call.

Unlike prior art fraud detection systems, fraud detection hardware 214 and fraud management center 216 can provide information useful in identifying the location of the PBX used for remote access to the network. For example, fraud detection hardware 214 provides the ANI of the PBX and its distance from fraud detection hardware 214. Where more than one PBX is involved, fraud detection hardware 214 provides the ANI of the PBX nearest in the call path to echo canceller 212 and the distance between this nearest PBX and any other PBXs in the call path. Fraud management center 216 also enables several different subscribers to cooperate to detect fraud in those instances where multiple PBX systems owned by different subscribers are involved.

In another exemplary embodiment of the invention, fraud detection hardware 214 compares the delay value measured using the probe signal with a known delay value for a given call (based on the point of origination of the call) to determine whether a call has multiple legs. Fraud detection hardware 214 can be provided with the ANI of the telephone originating the international call, which in the case of FIG. 2 is the ANI of PBX 200. Fraud detection hardware 214 uses the ANI to determine the distance between PBX 200 and echo canceller 212, for example, by accessing a lookup table. (The distances between most land-based system components are known.) Fraud detection hardware 214 then compares the experimentally-determined delay value with the known delay value. If the two values are equal, the call has only one leg. However, if the experimentally-determined delay value exceeds the known delay value, the call must have originated at a point further from echo canceller 212 (i.e., at telephone station 204) than PBX 200, thus indicating a multiple-leg call.

In still another exemplary embodiment of the invention, fraud detection hardware 214 compares the detected echo characteristics of the path of a telephone call with data representing attributes of the telephone call to determine whether the echo characteristics of the path are consistent with the call attributes. For example, fraud detection hardware 214 may be configured to determine the approximate distance between itself and to the point where the call originated, and compare that distance with the country code identifying the country in which the call originated. If the country code and the distance are inconsistent, fraud detection hardware 214 generates an indication that the access request is most likely fraudulent.

Although the invention has been described in the context of unauthorized calls placed to international destinations, one skilled in the art will appreciate that the principles of the invention are equally applicable to detecting unauthorized calls to domestic destinations. Similarly, the invention is not limited to fraud detection for calls involving the remote access capability of PBXs. Rather, the invention is readily applicable to any type of intermediate switching point. For example, the quasi-time domain reflectometry techniques of the invention are suitable for detecting fraud in "network-based" PBXs that are used in applications such as AT&T's EasyReach® 700 telecommunications service. The invention is applicable to any type of enhanced service involving multiple-leg calls.

Although the invention has been described in the context of voice communications, the principles of the invention also are applicable to data communications. Data transmissions are analyzed by first computing the autocorrelation of the transmitted signal. The autocorrelation function is processed to identify peaks, in a manner analogous to the techniques described above for identifying echo peaks. Peaks in the autocorrelation function correspond to echo peaks in a voice transmission, and are used in accordance with the teachings of the invention to identify multiple-leg calls.

I claim:

1. A method comprising the steps of:

analyzing echo characteristics of a path of a telephone call to determine whether the telephone call is a multiple-leg call;

collecting data representing attributes of the telephone call when the echo characteristics indicate that the telephone call is a multiple-leg call; and processing the data to generate an indication of whether the telephone call was established fraudulently.

2. The method of claim 1 wherein the processing step comprises determining whether the condition of at least one call attribute indicates that the telephone call was established fraudulently.

3. The method of claim 1 wherein the analyzing step comprises the steps of:

generating echo data for the telephone call from a predetermined point in the network to a point where the call originated; and responding to the echo data to generate an indication of whether the telephone call comprises multiple legs.

4. The method of claim 3 wherein the responding step comprises:

filtering the echo data to identify echo peaks; and generating an indication that the telephone call is a multiple-leg call if there are at least two identified echo peaks.

5. The method of claim 3 wherein the responding step comprises:

determining from the echo data the echo return loss between the predetermined point and the point where the call originated; and comparing the determined echo return loss with an expected echo return loss for the telephone call; and generating an indication that the telephone call is a multiple-leg call if the determined echo return loss exceeds the expected echo return loss by more than a predetermined amount.

6. The method of claim 3 wherein the responding step comprises:

determining from the echo data the approximate distance between the predetermined point and the point where the call originated; and comparing the determined distance with an expected distance for the telephone call; and generating an indication that the telephone call is a multiple-leg call if the determined distance exceeds the expected distance by more than a predetermined amount.

7. The method of claim 1 wherein the step of processing call attribute data comprises determining whether the call is placed to a country which belongs to a predetermined group of high-fraud countries.

8. A method comprising the steps of:

detecting the echo characteristics of the path of a telephone call;

collecting data representing attributes of the telephone call;

determining whether the collected data and the echo characteristics of the path are consistent with each other; and generating an indication that the telephone call was established fraudulently when the collected data and the characteristics of the path are inconsistent with each other.

9. The method of claim 8 wherein the detecting step comprises determining the approximate distance between a predetermined point in the path and a point where the call originated.

10. The method of claim 9 wherein the determining step comprises comparing said distance with a country code which identifies a country from which the telephone call originated.

* * * * *